(12) United States Patent
Kasuga et al.

(10) Patent No.: US 7,090,139 B2
(45) Date of Patent: Aug. 15, 2006

(54) IC CARD AND METHOD OF MANUFACTURING THE SAME

(75) Inventors: Masashi Kasuga, Suwa (JP); Wakao Miyazawa, Chino (JP); Fukumi Tsuchihashi, Chino (JP); Tomoyuki Kamakura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 66 days.

(21) Appl. No.: 10/395,112

(22) Filed: Mar. 25, 2003

(65) Prior Publication Data

US 2003/0209362 A1 Nov. 13, 2003

(30) Foreign Application Priority Data

Mar. 27, 2002 (JP) .............................. 2002-089678

(51) Int. Cl.
*G06K 19/06* (2006.01)
(52) U.S. Cl. ...................... 235/494; 235/380
(58) Field of Classification Search ................ 235/494, 235/492, 380; 365/228; 361/785
See application file for complete search history.

(56) References Cited

U.S. PATENT DOCUMENTS

| | | | | |
|---|---|---|---|---|
| 4,593,384 A * | 6/1986 | Kleijne | ...................... | 365/228 |
| 5,233,505 A * | 8/1993 | Chang et al. | ................ | 361/785 |
| 5,484,997 A * | 1/1996 | Haynes | ........................ | 235/492 |
| 5,590,038 A * | 12/1996 | Pitroda | ........................ | 705/41 |
| 5,612,532 A * | 3/1997 | Iwasaki | ........................ | 235/492 |
| 5,619,660 A * | 4/1997 | Scheer et al. | ................ | 710/301 |
| 5,734,154 A * | 3/1998 | Jachimowicz et al. | ....... | 235/492 |
| 5,988,510 A * | 11/1999 | Tuttle et al. | ................ | 235/492 |
| 6,182,892 B1 * | 2/2001 | Angelo et al. | .............. | 235/380 |
| 6,213,403 B1 * | 4/2001 | Bates, III | .................... | 235/492 |
| 6,293,470 B1 * | 9/2001 | Asplund | ...................... | 235/487 |
| 6,325,285 B1 * | 12/2001 | Baratelli | ...................... | 235/380 |
| 6,848,617 B1 * | 2/2005 | Fries et al. | .................. | 235/492 |
| 2001/0002874 A1 * | 6/2001 | Sakamoto et al. | ........... | 361/737 |

* cited by examiner

*Primary Examiner*—Daniel Stcyr
*Assistant Examiner*—Daniel A. Hess
(74) *Attorney, Agent, or Firm*—Oliff & Berridge, PLC (57) ABSTRACT

The invention provides an IC card in which it is difficult to separate IC chips from the IC card. In accordance with the invention, an IC card formed by laminating a plurality of substrates can include a sensor for identifying an authorized person, a signal processing circuit for processing the identification based on an output from the sensor and a card-shaped card medium containing the sensor and the signal processing circuit. At least the signal processing circuit can include a thin film circuit which is sufficiently thinner than the card medium and contains a material which is dissolvable equally to or more than the card medium.

7 Claims, 6 Drawing Sheets

A-B-C-D CROSS SECTION

FIG. 5

A-B-C-D CROSS SECTION

IC CARD AND METHOD OF MANUFACTURING THE SAME

BACKGROUND OF THE INVENTION

1. Field of Invention

The present invention relates to an IC card using thin film circuits and a method of manufacturing the same. More particularly, the invention relates to an IC card having thin film chips and a method of manufacturing the same.

2. Description of Related Art

An IC card exhibits various functions by containing IC chips in a card-shaped medium. The IC chip is made so as to be accommodated in the thickness (about 0.7 mm) of a card by reducing the thickness of a silicon substrate, on which LSI circuits are formed, by polishing it. Inserting the IC card into, for example, an automatic teller machine (ATM) permits money to be added to and taken out from an account in a bank. The IC card can be used for payments of shopping in a store. Further, the IC card also can be used as a commuter pass and a prepaid card in transportation facilities. To permit the IC card to be used as described above, there is available an IC card having an internal memory and the like in which various kinds of highly confidential information is recorded, such as card owner's personal information, identifying information, an account number, a user's number of a card firm, prepaid information (prepaid amount), and the like.

SUMMARY OF THE INVENTION

However, the IC card is ordinarily provided in the form of a plastic card. Since IC chips are composed of silicon whose melting point is higher than that of plastic, it can be contemplated to take out the IC chips from the inside of the card using any method. In this case, it can be contemplated that the recorded information is read out from a ROM and the like contained in an IC.

Further, when the IC card can identify an authorized person as a card owner, security can be more increased when the card is used. Further, it is convenient to use the IC card as a key card for coming into and coming out from a house or a specific place or for locking and unlocking a door of a vehicle.

Accordingly, an object of the present invention is to provide an IC card which makes it difficult for IC chips to be separated from the IC card.

Further, an object of the present invention is to provide an IC card which can identify an authorized person as a card owner.

Further, an object of the present invention is to provide an IC card having high security by itself and also having an authenticating function.

To achieve the above objects, an IC card of the present invention formed by laminating a plurality of substrates can include a sensor for identifying an authorized person, a signal processing circuit for processing the identification based on an output from the sensor, and a card-shaped card medium containing the sensor and the signal processing circuit. At least the signal processing circuit is composed of a thin film circuit which is sufficiently thinner than the card medium and contains a material which is dissolvable equally to or more than the card medium. With the above arrangement, when it is intended to take out the signal processing circuit from the inside of the IC card, the thin film circuit is easily broken, which can prevent the information stored in the signal processing circuit (thin film circuit) from being taken out to the outside.

It is preferable that the substrate of the thin film circuit be selected from a material which prevents the melting point of the substrate from being in excess of the melting point of the card medium. With this arrangement, when it is intended to take out the signal processing circuit (thin film circuit) by melting the card, the thin film circuit is also melted and broken. The information recorded in the signal processing circuit cannot be read out.

It is preferable that the IC card further include a display formed of a thin film for displaying a result of the identification processing. With this arrangement, a result of identification based on an output of the sensor can be displayed to the outside.

It is preferable that the signal processing circuit include an arithmetic operation circuit and a memory circuit. With this arrangement, it is possible to authenticate an authorized person by executing a previously stored processing program and comparing the recorded information with the output of the sensor.

It is preferable that the memory circuit record information for identifying the authorized person. When the IC card, in which the information for identifying the authorized person is previously recorded, is issued, it is possible to construct a card system which can be used only by the authorized person or which can be used on the condition that the authorized person is authenticated.

It is preferable that the sensor be a fingerprint detection sensor. A probability of discriminating between the authorized person and other person is increased by using the fingerprint for identification.

It is further preferable that the information for identifying the authorized person be a fingerprint characteristic parameter. The authorized person can be identified by previously storing the fingerprint characteristic parameter of the authorized person and comparing the characteristic parameter with the characteristic parameter of a detected fingerprint.

An IC card of the present invention formed by laminating a plurality of substrates can include a first substrate having a sensor device and a display device disposed on one surface and a signal processing device composed of a thin film circuit and disposed on the other surface, a second substrate having a sensor window and a display device window at positions corresponding to the sensor device and the display device, respectively, having wiring films on a surface facing the one surface of the first substrate, and bonded to the first substrate, and a third substrate bonded to the other surface of the first substrate. With this arrangement, the IC card can be used easily by increasing the ratio of the sensor device and the display device occupying the IC card. Further, there can be obtained the IC card which includes the substrate, on which the signal processing device composed of the thin film circuit is mounted, and the two substrates for protecting the above substrate on both the sides thereof.

It is preferable that the wirings between the substrates be connected through anisotropic conductive films. With this arrangement, the wirings can be connected between the substrates by a bonded structure without executing wire bonding.

It is preferable that the first substrate contain an FPC (flexible printed circuit). With this arrangement, the resistance of the card against flexure, bending, and the like can be improved. Further, using the flexible resin thin film substrate makes the physical properties (mechanical properties and thermally softening properties) thereof near to those of the plastic material of the IC card, which permits the thin film circuit to be broken when the plastic material is dissolved.

It is preferable that the display device be a flat display device and includes a liquid crystal device and an organic EL display. These displays can be composed of a thin film and can be contained in the IC card.

It is further preferable that the sensor device include at least a fingerprint sensor and a hand writing sensor. With this arrangement, it is possible to authenticate (identify) the authorized person actually possessing the IC card.

It is preferable that externally connection terminals be formed on the front surface or the back surface of the IC card. With this arrangement, power can be supplied from the outside, and a signal can be transmitted between the IC card and an external device. Note that a battery may also be contained in the inside of the IC card.

It is preferable that the first substrate have through-holes for connecting the circuits on the one surface to the circuits on the other surface. With this arrangement, the circuits on the front surface of the substrate are connected to those of the back surface of the substrate.

It is preferable that the display device window of the second substrate be formed transparent. With this arrangement, the display is protected while securing the visibility of the display.

It is preferable that the first substrate be a thin film substrate and that the second and third substrates be thick film substrates relatively thicker than the first substrate. With this arrangement, it is possible to protect the thin film substrate on which the thin film circuits are mounted by clamping it between both the sides thereof.

It is preferable that the second and third substrates be substrates for protecting the first substrate. With this arrangement, the thin film substrate on which the thin film circuits are mounted is protected on both the sides thereof.

It is preferable that a wiring film connected to any device of the first substrate be formed on the surface of the second or third substrate facing the first substrate. With this arrangement, the devices mounted on the same substrate can be easily connected by a laminated structure (bonding) making use of the wiring film of the surface facing the substrate.

An IC card of the present invention formed by bonding a plurality of substrates can include a first substrate having a sensor device and a signal processing device disposed on one surface, and a second substrate having a wiring film, a window, and a display device disposed on a surface facing the one surface of the first substrate, the wiring film forming wirings between or in the devices, the window exposing the sensor device, and the display device being disposed in correspondence to the signal processing device. The two-layer structure also makes it possible to arrange the IC card whose usability is improved by increasing the ratio of the sensor device and the display device occupying the IC card.

It is additionally preferable that the IC card further include anisotropic conductive films for connecting at least any device of the first substrate to the wiring film of the second substrate. With this arrangement, wirings can be connected by the laminated structure without executing wire bonding.

An IC card of the present invention can have terminals formed at an end of a substrate for connecting internal circuits to the outside. The terminals protrude from any one substrate and are exposed on the front surface of the IC card and are fitted into fitting portions formed on other substrate.

A method of manufacturing an IC card of the present invention can include a step of forming a thin-film-circuit-mounted substrate by transferring thin film circuits formed on a tentative substrate onto a thin film substrate for the IC card, and a step of bonding protective substrates to both the sides of the thin-film-circuit-mounted substrate, respectively. With the above arrangement, the IC card can be assembled by transferring the thin film circuits made on the tentative substrate in different processes (signal processing device, various sensors, display, memory circuit, audio generator, radio wave generator, signal receiver, and the like) onto the thin film substrate (intermediate substrate) of the IC card by a technology for transferring thin film circuits between substrates.

A method of manufacturing an IC card of the present invention can include a step of forming a thin-film-circuit-mounted substrate by transferring thin film circuits formed on a tentative substrate onto a thin film substrate for the IC card, and a step of bonding a protective substrate on the thin-film-circuit-mounted substrate. With the above arrangement, the IC card can be assembled by transferring the thin film circuits made on the tentative substrate in different processes (signal processing device, sensor, display, memory circuit, audio generator, radio wave generator, signal receiver, and the like) onto the thin film substrate of the IC card by a technology for transferring thin film circuits between substrates.

It is preferable that connection terminals be previously formed to the thin film circuits, wiring films be previously formed to the protective substrate and, at the bonding step, the thin film circuit be connected to the wiring film by bonding the thin film substrate to the protective substrate through anisotropic conducive films. With this arrangement, the wirings can be easily connected by the laminated structure.

It is preferable that the bonding step include a positioning step of fitting connection terminals formed to any one of the substrates to fitting portions formed to the other substrate. With this arrangement, the respective substrates can be easily positioned when they are connected to each other.

BRIEF DESCRIPTION OF THE DRAWINGS

The invention will be described with reference to the accompanying drawings, wherein like numerals reference like elements, and wherein.

DESCRIPTION OF PREFERRED EMBODIMENTS

Embodiments of the present invention will be described below with reference to drawings.

Figure 1:
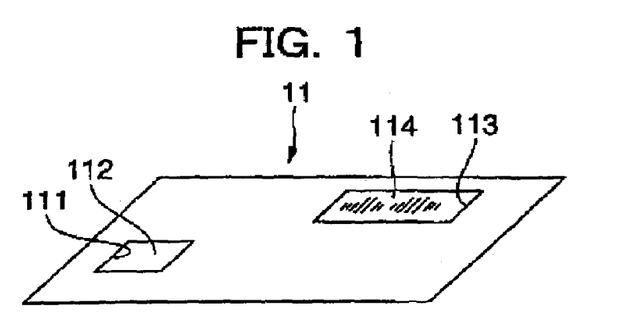
FIG. 1 is a perspective view explaining an example of an outside view of an IC card of the present invention.

FIG. 1 shows an example of an IC card according to the present invention. As shown in the figure, the IC card 11 can be formed in an approximately rectangular shape with a thickness of about 0.7 mm. A sensor window 111 is formed on the front surface of the IC card 11, and a sensor 112 exposes therethrough. The sensor 112 is, for example, a sensor for authenticating the owner of the IC card and includes a fingerprint sensor, hand writing sensor, and the like. Further, a transparent window 114 for a display 113 is formed on the front surface of the IC card 11. A liquid crystal display and an organic EL display, which can be formed of a thin film, are suitable as the display 13. As described below, the IC card 11 is formed by laminating a plurality of substrates, and the sensor, an IC circuit, the display, wirings, and the like are formed in the substrates.

Figure 2:
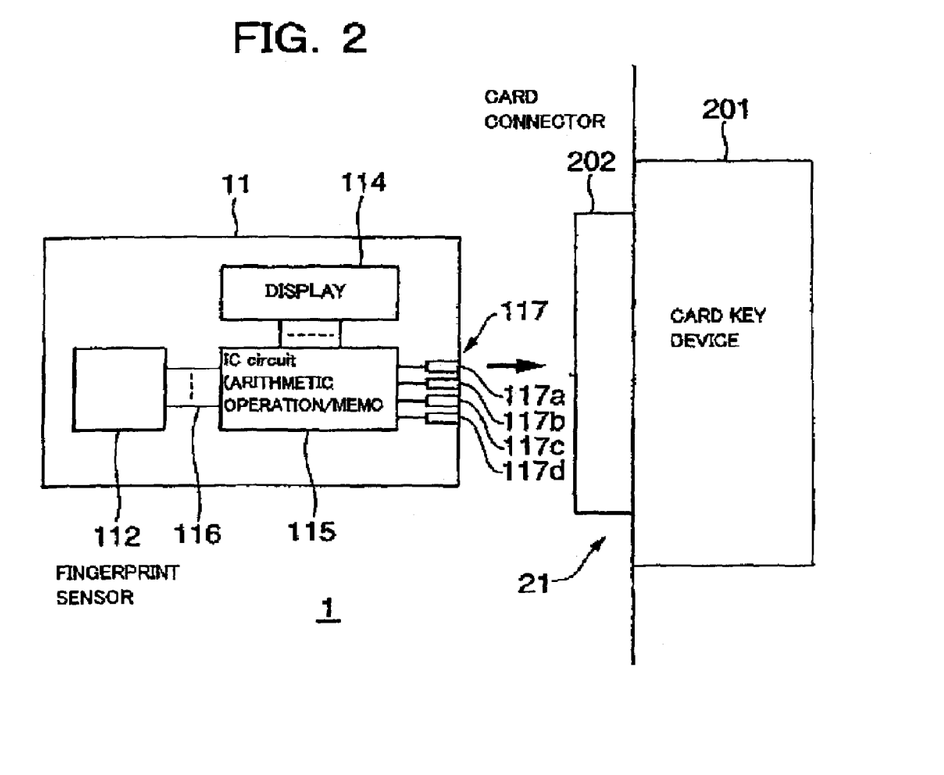
FIG. 2 is a block diagram explaining an example of an authentication system using an IC card.

FIG. 2 is a view explaining an example of an authentication system for identifying an authorized person using an IC card. In the figure, the portions corresponding to those in FIG. 1 are denoted by the same reference numerals. In this example, it is confirmed by a fingerprint sensor 112 that the owner of the IC card is the authorized person.

The fingerprint sensor 112, a display 114, an IC circuit 115, wirings 116, and a connector (plug) 117 are disposed in an IC card 11. When the connector 117 is inserted into a connector 202 of a card key system 21 which will be described later, electric power is supplied from the card key system 21 to the IC card 11. Also, a sheet battery may be contained in the IC card 11.

The fingerprint sensor 112 is composed of a matrix of fine capacitor electrodes each formed of a thin film circuit. When a finger tip touches a group of the capacitor electrodes, a capacitance is detected along a fingerprint, and the pattern of the fingerprint is detected. The pattern information is supplied to the IC circuit 115. The IC circuit 115 is composed of one chip microcomputer and includes an arithmetic operation circuit, a memory circuit (including a temporary memory circuit and a non-volatile memory circuit), an interface, a drive circuit of the display 114, and the like. The IC circuit 115 reads a signal from the sensor 112, extracts the characteristics of the fingerprint pattern, and calculates a characteristic parameter representing the features. Then, the IC circuit 115 determines coincidence or a degree of similarity between the calculated characteristic parameter and the characteristic parameter of the fingerprint of the authorized person previously written to the non-volatile memory. A result of determination is displayed on the display 114. The display has a surface area of, for example, 28 characters×2 rows. One character can be set to 8×6 dots, and one dot can be set to 350 microns. Additionally, the surface area can be arbitrarily determined. As described above, various types of display elements, such as liquid crystal, organic electroluminescence, light emitting diodes, and the like can be appropriately selected.

In this example, the connector 117 of the IC card 11 has power supply terminals 117a and 117b and signal terminals 117c and 117d. When the IC card 11 is connected to the card connector 202, electric power is supplied to the IC circuit 115 through the power supply terminals 117a and 117b. Further, the electric power is also supplied to the fingerprint sensor and the display 114. With this operation, the IC circuit (CPU) 115 is activated and executes a program. Communication is executed between the IC card 11 and a card key device 201 through the signal terminals 117c and 117d according to a previously determined protocol, thereby the IC card 11 can be used. When the authorized person touches the fingerprint sensor 112, the authorized person is identified by the IC circuit 115, and a result of identification is supplied to the card key device 201 through the signal terminals 117c and 117d and the card connector 202.

The card key device 201 is combined integrally with, for example, a door lock device, an ATM device, a POS terminal, and the like. A door is unlocked, a transaction through an account is permitted, and using a credit card is permitted according to a result of authentication of the authorized person executed by the IC card 11. The IC card 11 can be also provided with ordinary IC card functions, in addition to the authorized person identifying function described above. With the above arrangement, the IC card 11 can be prevented from being used by a person other than the authorized person.

In the authorized person authentication system described above, the card key device 201 is not provided with a logic (fingerprint discrimination processing) for identifying the authorized person. Accordingly, it is not necessary to deliver identification data such as a fingerprint and the like from the IC card 11 to the card key device 201, resulting in a less possibility of leakage of information as to privacy. Further, the card key device 201 can be prevented from beginning to identify the authorized person based on false identification data input form a person other than the authorized person.

Figure 3:
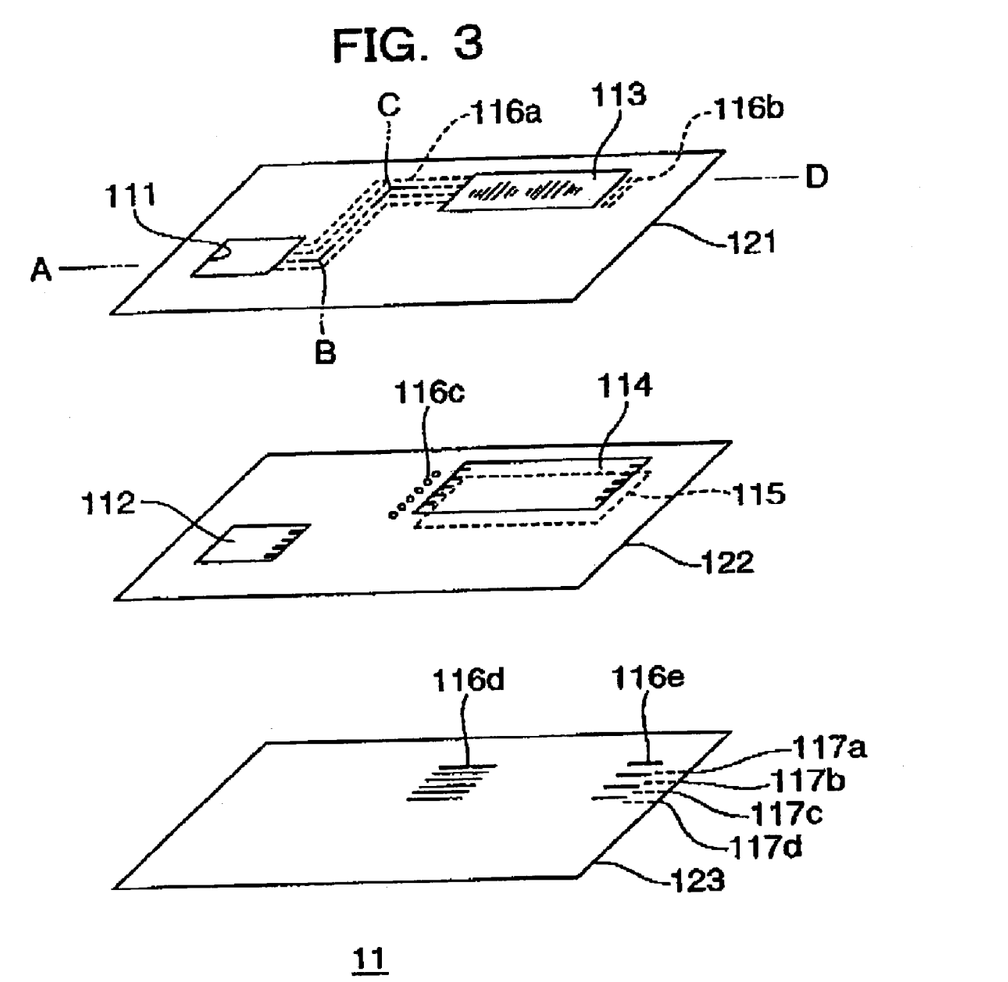
FIG. 3 is a perspective view explaining a laminated structure of the IC card.
Figure 4:
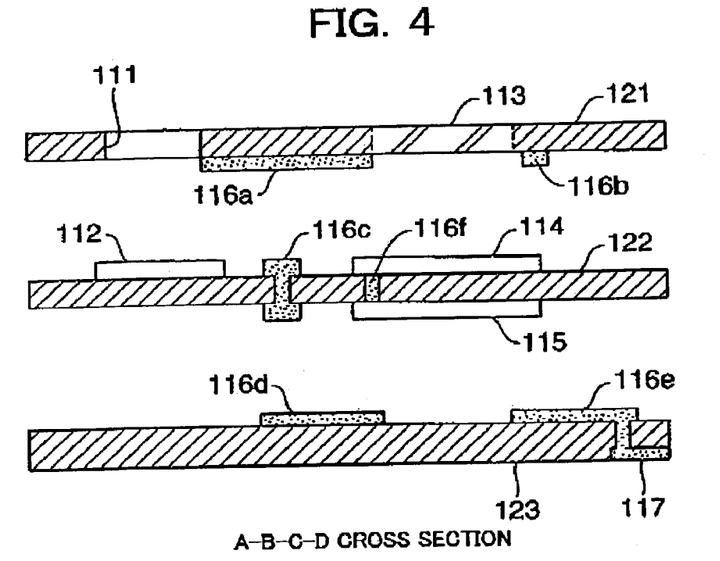
FIG. 4 is a sectional view explaining a structure of respective layers of an IC card having a three-layer structure.
Figure 5:
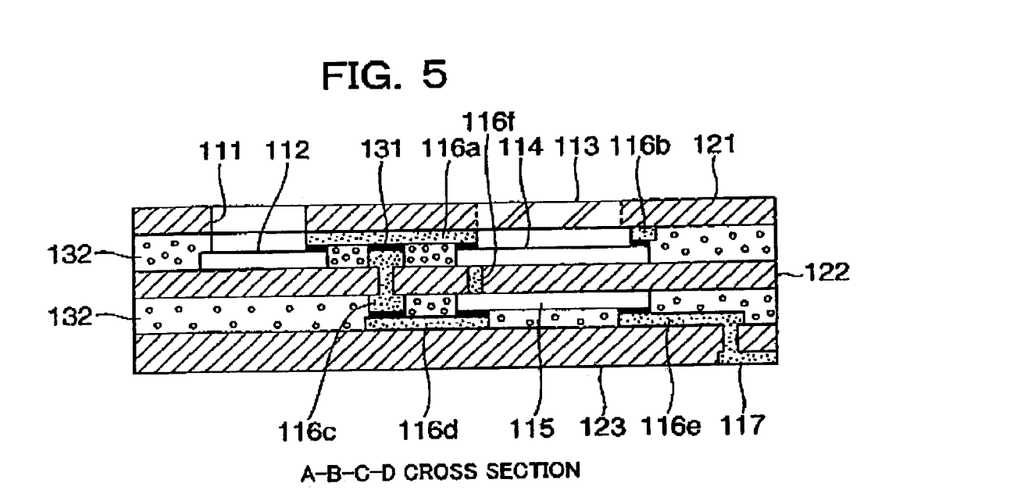
FIG. 5 is a sectional view explaining an assembled state of the IC card having the three-layer structure.

FIGS. 3 to 5 explain a case in which the IC card 11 is formed of three substrates. FIG. 3 is a perspective view showing the three substrates in a discrete state, and FIG. 4 is a sectional view schematically showing cross sections in directions A, B, C, and D shown in FIG. 3. FIG. 5 is a sectional view schematically explaining a state in which the three substrates are bonded together. In the respective figures, corresponding portions are denoted by the same reference numerals.

As shown in FIGS. 3 and 4, a window 111 is formed through a portion of a first substrate 121. Further, other portion of the first substrate 121 is arranged as a transparent window 113. These windows correspond to the positions of a fingerprint sensor 112 and a display 114 which are formed on a second substrate 122, respectively.

A wiring film 116a for connecting the display 114, the fingerprint sensor 112, and an IC circuit 115 is formed on the back (lower) surface of the first substrate 121 between the window 111 and the transparent window 113. Further, a wiring film 116b for auxiliarily wiring the display 114 is formed on the back surface.

The fingerprint sensor 112 is disposed on the front (upper) surface of the second substrate 122 at a position facing the window 111 of the substrate 121. Further, the display 114 is disposed on the front surface of the second substrate 122 at a position corresponding to the window 113 of the substrate 121. The IC circuit 115 is disposed on the back (lower) surface of the substrate 122 at a position corresponding to the display 114. A through-hole is formed in the portion of the second substrate 122 sandwiched between the display 114 and the IC circuit 15 (refer to FIG. 4), and the display 114 is connected to the IC circuit 115 through a plug 116f.

Further, a through-hole is also formed through the substrate 122 at a position corresponding to the wiring film 116a of the first substrate 121, and a plug 116c is disposed in the through-hole.

A wiring film 116d for connecting the plug 116c to the IC circuit 115 is disposed on the front (upper) surface of the third substrate 123. Connection terminals 117a–117d are formed at a right end of the substrate 123. A wiring film 116e for connecting the terminals 117a–117d to the terminal of the IC circuit 115 is formed on the front surface of the substrate 123. Electric power can be supplied through the terminals 117a and 117b is supplied to the fingerprint sensor 112 and the display 114 through the IC circuit 115.

As shown in FIG. 5, bonding layers 132 can be formed between the first to third substrates formed as described above by applying an adhesive, and the like between the respective substrates, and the terminals of the respective devices and the wiring films are bonded to each other through anisotropic conductive films 131. The anisotropic conductive films can be obtained by mixing conductive fine particles in, for example, insulative rubber and resin. When the anisotropic conductive films are clamped by the terminals and the like from both the sides thereof and compressed, the conductive fine particles in the films are connected to each other, and the films are made conductive in a direction in which they are clamped. Further, the wiring film 116a is connected to the plug 116c through an anisotropic conductive film 131.

While the respective substrates are shown relatively thick in the above arrangement, for example, the first substrate is a plastic substrate (resin substrate) having a thickness of about 315 μm, the second substrate is an FPC substrate having a thickness of about 25–50 μm, and the third substrate is a plastic substrate (resin substrate) having a thickness of about 315 μm. Further, the two bonding films have a thickness of about 10 μm, respectively. Accordingly, the second substrate is considerably thinner than the other substrates. Further, the fingerprint sensor 112, the display 114, and the IC circuit 115 are composed of a thin film circuit using TFT transistors and the like of an SOI arrangement. The thin film circuits permit to arrange the devices very thin by using the film substate (FPC). It is not necessary to reduce the thickness of a silicon chip (substrate) from about 500 μm to about 50 μm by polishing it as performed conventionally. Since the respective substrates are resin (or plastic) insulative substrates, when it is intended to split and break the first or second substrate, the second thin substrate is also broken. Further, when it is intended to take out the IC circuit 115 by heating and melting the first or the second substrate, the second substrate and the thin film circuits are melted together with them and broken. Accordingly, it is difficult to take out information from the inside (memory) of the IC card.

Note that, as apparent from FIG. 5, the IC circuit (thin film circuit) 115 may be formed on the substrate 123 and may be bonded to the substrate 122. In this case, since the thin film circuits exist on one surface of the respective substrates, transfer of the thin film circuits, which will be described below, can be easily executed.

Figure 6:
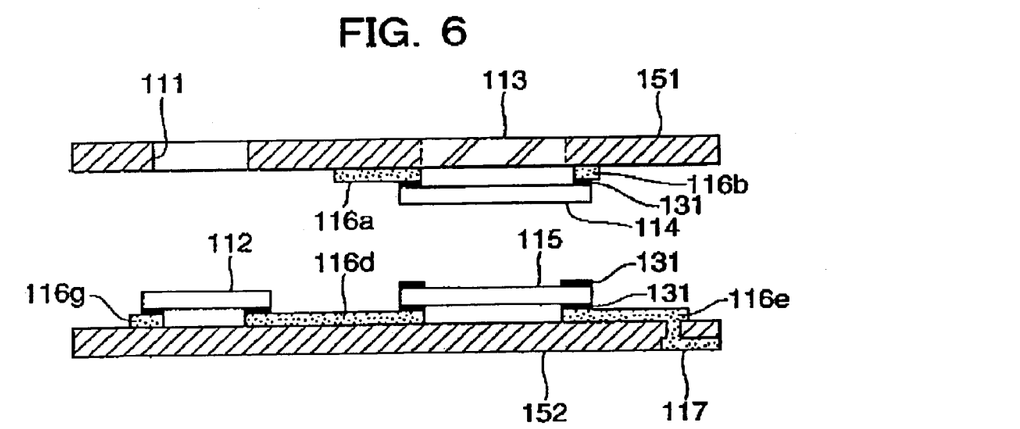
FIG. 6 is a sectional view explaining a structure of respective layers of an IC card having a two-layer structure.
Figure 7:
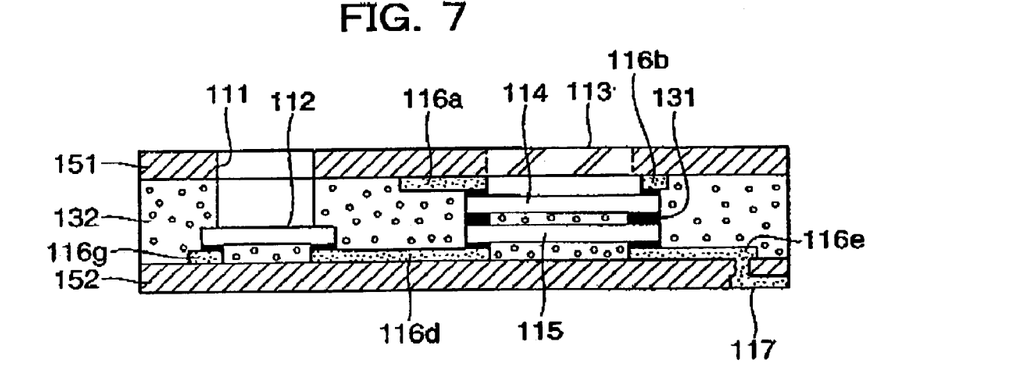
FIG. 7 is a sectional view explaining an assembled state of the IC card having the two-layer structure.

FIGS. 6 and 7 show an example in which an IC card is composed of two substrates. FIG. 6 is a view explaining an approximate cross section of the two substrates before they are assembled. FIG. 7 is a view explaining an approximate sectional view of the IC card after it is assembled. In FIGS. 6 and 7, portions corresponding to those of FIGS. 4 and 5 are denoted by the same reference numerals.

In this embodiment, an upper substrate 151 and a lower substrate 152 are used. A window 111 for a fingerprint sensor 112 is disposed on the upper substrate 151. Further, a transparent window 113 for a display 114 is disposed on the upper substrate 151. Wiring films 116a and 116b are formed on the back surface (lower surface) of the upper substrate 151, and the display 114 is connected to these wiring films through anisotropic conductive films 131. Wiring films 116d, 116e, and 116g are formed on the front surface (upper surface) of the lower substrate 152, and a plug 117 connected to the wiring film 116e is formed at the right end of the lower substrate 152. An IC circuit 115 is disposed above the wiring films 116d and 116e through anisotropic conductive films 131. An IC circuit 115 is disposed above the wiring films 116d and 116e through anisotropic conductive films 131.

As shown in FIG. 7, the upper substrate 151 is bonded to the lower substrate 152 through adhesive films 132 composed of an adhesive. At this time, the terminals of the display 114 is connected to the terminals of the IC circuit 115 through anisotropic conductive films 131.

In the above arrangement, the upper substrate 151 and the lower substrate 152 are formed of a relatively thick plastic substrate (resin substrate).

Figure 8:
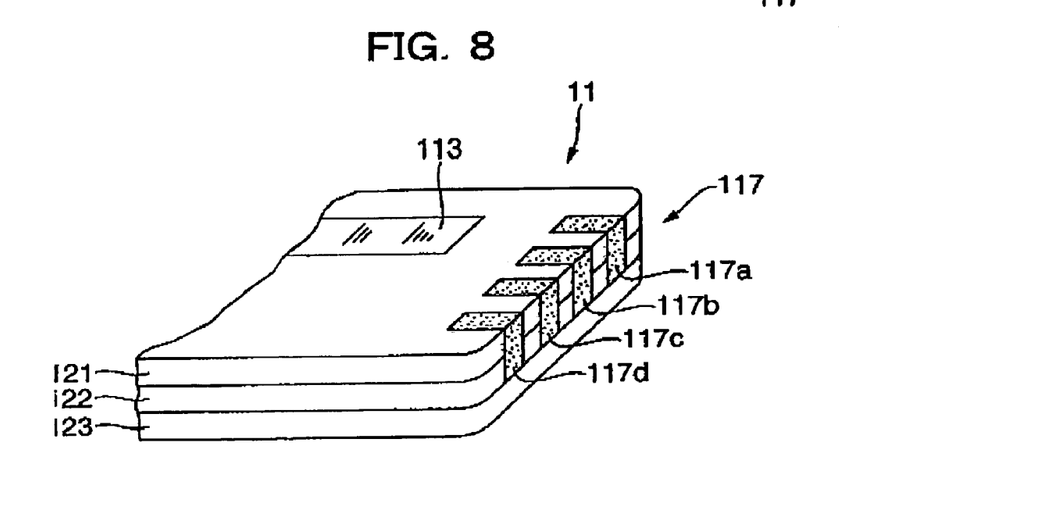
FIG. 8 is a perspective view explaining an example in which plugs of an IC card are used to positioning of respective layers.
Figure 9:
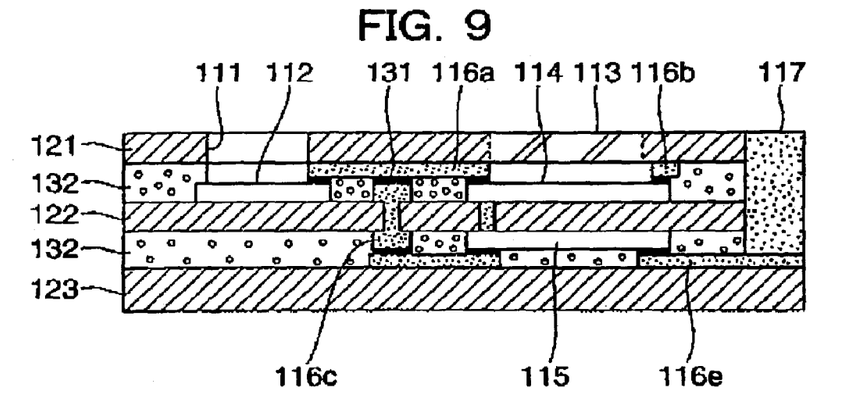
FIG. 9 is a sectional view explaining an example in which plugs of an IC card having a three-layer structure are used to alignment of the card.

FIGS. 8 and 9 show another example of a connector (plug) portion of the IC card of the present invention. In FIGS. 8 and 9, portions corresponding to those of FIGS. 3 and 5 are denoted by the same reference numerals.

In this example, plugs 117a–117d formed in any of the substrates are fitted into recessed portions of other substrate. With this arrangement, the substrates can be easily aligned with each other. In the perspective view shown in FIG. 8, the plugs formed in a third substrate 123 are fitted into recessed portions of the second substrate 122 and the first substrate 121 at positions corresponding to the plugs of the first substrate 121. FIG. 9 shows a sectional view of the substrates 121, 122, and 123, wherein the plug 117 formed on a wiring film 116e of the substrate 123 is fitted into the recessed portions of the substrates 122 and 121 and exposed on the front surface of the first substrate 121. The exposed surface acts as a contact surface of a card key device 201 in contact with a card connector 202.

Figure 10:
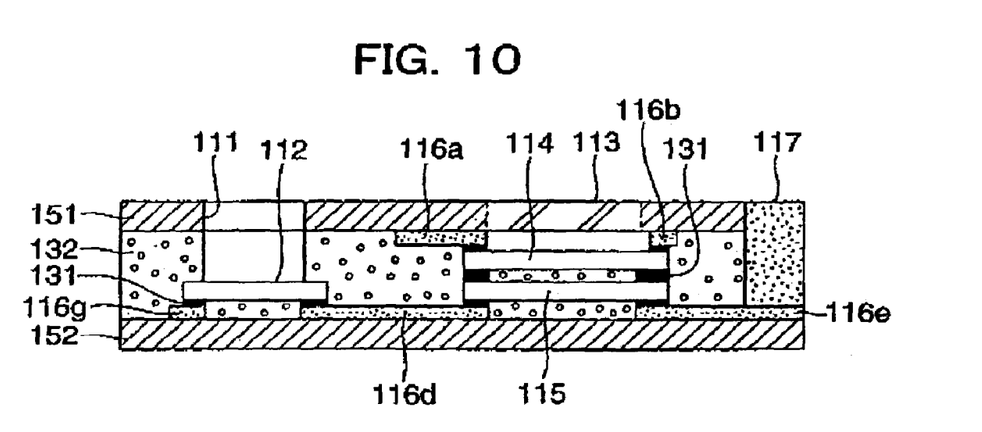
FIG. 10 is a sectional view explaining an example in which plugs of an IC card having a two-layer structure are used to alignment of the card.

FIG. 10 shows an example of a plug of a two-layered substrate. Portions corresponding to those of FIG. 7 are denoted by the same reference numerals. In this example, a plug 117 formed on a wiring film 116e of a lower substrate 152 is fitted into a recessed portion disposed in a connector portion of an upper substrate 151. Accordingly, the substrates can be easily aligned with each other.

Figure 11:
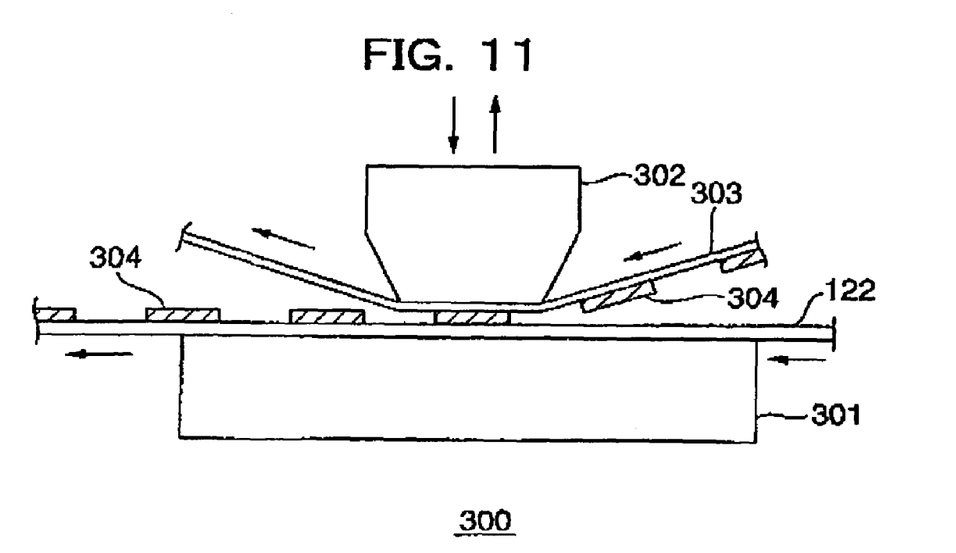
FIG. 11 is a view explaining an example in which thin film circuits are transferred onto an IC card substrate by transferring them from a tentative substrate.

FIG. 11 is a view explaining a transfer process 300 for transferring thin film circuits onto an IC card substrate. A thin film transfer apparatus 300 can include a bed 301 and a head 302. The bed 301 and the head 302 move relatively with each other. For example, the head 302 reciprocates in an up/down direction so that a flexible tentative substrate 303 and the IC card substrate 122 are clamped. The thin film circuits 304 are formed on one surface (lower surface) of the tentative substrate at prescribed intervals. The thin film circuits 304 correspond to the signal processing circuit (IC circuit) 115, the sensor unit 112, the display 114, the wiring films 116, and the like described above. The thin film circuits 304 are bonded onto the tentative substrate 303 at the prescribed intervals. Preferably used in the bonding are a tentative adhesive, for example, a thermally-exfoliating resin and an ultraviolet-ray-exfoliating resin, an exfoliating film, for example, an amorphous silicon film whose coupling forced is lost by laser ablation, and the like. The tentative substrate 303 is wound around a not shown reel and the like. The IC card substrate 122 also moves in synchronism with the feed of the tentative transfer substrate 303. A permanent adhesive (not shown) is partly applied onto the transfer positions of the IC card substrate 122.

When a thin film circuit 304 is located at a prescribed position on the IC card substrate 122, the head 302 moves downward and presses the thin film circuit 304 against the IC card substrate 122 and causes the thin film circuit 304 to come into intimate contact with the IC card substrate 122. At this time, a tentative adhesive layer and an exfoliation layer between the tentative substrate 303 and the thin film circuit 304 are separated or broken by applying heat or irradiating ultraviolet rays or laser from the back surface of the tentative substrate 303 to the back surface of the thin film circuit 304. At the same time, the thin film circuit 304 is bonded to the IC card substrate 122 by curing a bonding layer applied to the IC card substrate 122 by keeping the bed 301 at a prescribed temperature. A permanent adhesive having temperature characteristics opposite to those of the tentative adhesive may be used. The head 302 is returned upward, the tentative substrate 303 is moved, and the thin film circuit 304 is transferred. The thin film circuits (including the signal processing circuit, the sensor, the wirings, and the like) can be formed on the IC card substrates 121, 122, and 123 as described above. Note that the head 302 may be a rotatable head, in addition to the illustrated head reciprocating up and down.

Thereafter, IC cards 11 are made by bonding the IC card substrates, on which the thin film circuits and the like are formed, to each other through anisotropic conductive films, an adhesive, and the like and cutting off the bonded IC card substrates to a card size.

As described above, since the IC card of the embodiment of the present invention can include the sensor and the signal processing circuit, it is possible to authenticate (identify) the authorized person to which the card is issued, in addition to the ordinary IC card functions. Accordingly, a person other than the authorized person cannot use the IC card, which is convenient for the security of a transaction and an entrance/exit system using the card.

Further, since the IC card contains the IC circuits made of the thin film circuits, it is not necessary to reduce the thickness of the substrate by polishing it different from IC circuits made of silicon chips. Accordingly, a manufacturing process can be reduced.

Further, when it is intended to break and melt the IC card (by heat, solvent, and the like) the IC circuits (thin film circuits) are also broken, which prevents the information in the inside of the IC card from being taken out.

According to the method of manufacturing the IC card of the embodiment, a circuit having a large area can be easily manufactured because the IC card is assembled by bonding the thin film circuits of the respective devices manufactured separately on the substrates. Further, since the thin film circuits having a different function can be bonded together, they can easily support various applications, which is convenient to manufacture the IC card.

As described above, the IC card of the present invention contains the sensor, which identifies that a card owner and the like are the person previously recorded in the card, and the signal processing circuit, which is composed of the thin film circuit and executes identification. Accordingly, the IC card is preferable in that it can identify a prescribed person as well as make it difficult to read out information from the signal processing circuit to thereby increase the security (confidentiality) in the transaction using the card and in the use of the card.

Further, according to the method of manufacturing the IC card, the IC card can be manufactured by transferring the thin film circuits manufactured separately onto the substrates of the IC card or combining the thin film circuits having a different function. Accordingly, various functions can be realized in the IC card by using the thin film circuits having various functions (sensor, display, signal processing circuit, memory circuit, audio output circuit, radio wave generation circuit, and the like).

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without depending from the spirit and scope of the invention.

What is claimed is:

1. An IC card, comprising:
   a first substrate;
   an IC circuit formed on the first substrate, the IC circuit processing an information, the IC circuit including a transistor, the transistor being bonded to the first substrate via an adhesion film; and
   a second substrate, the second substrate and the first substrate sandwiching the IC circuit and a sensor element, a melting point of the IC circuit being lower than a melting point of at least one of the first substrate and the second substrate.

2. The IC card according to claim 1, at least one of the first substrate and the second substrate including a resin material.

3. The IC card according to claim 1, further comprising: the sensor element reading the information through a window portion, the second substrate having a window portion.

4. The IC card according to claim 1, further comprising: a display device being formed between the first substrate and the second substrate.

5. The IC card according to claim 1, further comprising: a third substrate being formed between the first substrate and second substrate.

6. The IC card according to claim 1, further comprising: a third substrate, the first substrate being formed between the second substrate and the third substrate.

7. The IC card according to claim 1, further comprising: a third substrate, the second substrate being formed between the first substrate and the third substrate.

* * * * *